(12) United States Patent
Hattori

(10) Patent No.: US 11,805,326 B2
(45) Date of Patent: Oct. 31, 2023

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventor: Mitsuaki Hattori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 17/684,571

(22) Filed: Mar. 2, 2022

(65) Prior Publication Data

US 2022/0286655 A1 Sep. 8, 2022

(30) Foreign Application Priority Data

Mar. 5, 2021 (JP) .................................. 2021-035634

(51) Int. Cl.
| | |
|---|---|
| H04N 23/88 | (2023.01) |
| H04N 9/77 | (2006.01) |
| H04N 23/66 | (2023.01) |
| H04N 23/63 | (2023.01) |
| H04N 23/71 | (2023.01) |
| H04N 9/73 | (2023.01) |
| H04N 23/667 | (2023.01) |

(52) U.S. Cl.
CPC .............. *H04N 23/88* (2023.01); *H04N 9/77* (2013.01); *H04N 23/63* (2023.01); *H04N 23/633* (2023.01); *H04N 23/667* (2023.01); *H04N 23/71* (2023.01); *H04N 9/73* (2013.01)

(58) Field of Classification Search
CPC ........ H04N 23/73; H04N 23/74; H04N 23/70; H04N 23/71; H04N 9/73; H04N 23/56; H04N 9/64; H04N 1/60; H04N 23/88; H04N 9/77; H04N 1/6077
See application file for complete search history.

(56) References Cited

U.S. PATENT DOCUMENTS

| | | | |
|---|---|---|---|
| 11,190,745 B2* | 11/2021 | Izuta | .......................... G06T 1/00 |
| 2004/0017594 A1* | 1/2004 | Suekane | .............. H04N 1/6011 |
| | | | 358/448 |
| 2010/0208098 A1* | 8/2010 | Ogawa | ................. H04N 23/667 |
| | | | 348/E9.051 |

(Continued)

FOREIGN PATENT DOCUMENTS

JP 2002-218495 A 8/2002

*Primary Examiner* — Abdelaaziz Tissire
(74) *Attorney, Agent, or Firm* — Cowan, Liebowitz & Latman, P.C.

(57) ABSTRACT

An image processing apparatus obtains an image captured in an image capturing and sets a white balance recording mode for recording the image as a still image and a white balance display mode for displaying the image before being captured as the still image on a display. The apparatus controls white balance correction performed on the image captured in the image capturing. In a case where a first display mode that is included in the display mode is set, the apparatus sets an amount of a light source color that remains after the white balance correction is performed on the image before being captured as the still image in the first display mode to be larger than the amount of the light source color that remains after the white balance correction is performed on the still image in the recording mode.

12 Claims, 8 Drawing Sheets

(56) References Cited

U.S. PATENT DOCUMENTS

| | | | |
|---|---|---|---|
| 2011/0292242 A1* | 12/2011 | Imai | H04N 23/633 348/E5.037 |
| 2014/0009683 A1* | 1/2014 | Yoshida | H04N 23/88 348/655 |
| 2015/0350620 A1* | 12/2015 | Kuchiki | H04N 25/134 348/223.1 |
| 2021/0360213 A1* | 11/2021 | Hattori | H04N 23/88 |

* cited by examiner

FIG. 8

| No | STILL IMAGE RECORDING MODE | VIEWFINDER DISPLAY MODE | REMAINING AMOUNT OF LIGHT SOURCE COLOR |
|---|---|---|---|
| 1 | ATMOSPHERE PRIORITY | NAKED EYE VIEW EQUIVALENT DISPLAY | LIGHT SOURCE COLOR REMAINS MORE IN VIEWFINDER DISPLAY MODE THAN IN STILL IMAGE RECORDING MODE |
| 2 | ATMOSPHERE PRIORITY | STILL IMAGE RECORDING EQUIVALENT DISPLAY | REMAINING AMOUNT IS SAME IN VIEWFINDER DISPLAY AND STILL IMAGE |
| 3 | WHITE PRIORITY | NAKED EYE VIEW EQUIVALENT DISPLAY | LIGHT SOURCE COLOR REMAINS MORE IN VIEWFINDER DISPLAY MODE THAN IN STILL IMAGE RECORDING MODE |
| 4 | WHITE PRIORITY | STILL IMAGE RECORDING EQUIVALENT DISPLAY | REMAINING AMOUNT IS SAME IN VIEWFINDER DISPLAY AND STILL IMAGE |

IMAGE PROCESSING APPARATUS, CONTROL METHOD THEREOF, AND STORAGE MEDIUM

BACKGROUND OF THE INVENTION

Field of the Invention

The present invention relates to an image processing apparatus, a control method thereof, and a storage medium.

Description of the Related Art

Conventionally, a mirrorless camera that includes an electronic viewfinder (EVF) instead of an optical finder is known. With this camera, image processing parameters that are the same as those applied to a still image that is recorded is applied to an image that is displayed on the EVF, and thus a photographer can check how a finished still image will look like before capturing the image.

On the other hand, when image processing parameters that are the same as those applied to a still image that is recorded is applied to an image that is displayed on the EVF, the color tone may be different from the color tone of what the photographer actually sees with the naked eye in the image capturing environment. For this reason, a photographer who is accustomed to capturing images using a camera with an optical finder may feel uncomfortable when looking at the images displayed on the EVF. Specifically, a recorded image may appear more favorable by, when image capturing is performed using an auto white balance function, correcting the reddish color of a light bulb color light source, the bluish color of a shade, and the like such that the atmosphere of a light source color does not remain as compared to that seen with the naked eye, and then recording the image as a still image. Accordingly, when white balance correction values that are applied to still images that recorded are applied to the images displayed on the EVF, a significant difference may occur between how the images displayed on the EVF look like and how a subject looks like with the naked eye.

Japanese Patent Laid-Open No. 2002-218495 is known as a document that proposes a technique for recording still images using an auto white balance function. Specifically, Japanese Patent Laid-Open No. 2002-218495 proposes a technique in which, when a photographer records still images using an auto white balance function, the photographer manually sets the degree of correction in auto white balance applied to the still images, and sets the degree of the atmosphere of a light source color to a desired degree.

In the case where the technique disclosed in Japanese Patent Laid-Open No. 2002-218495 is used together with displaying on the EVF so as to bring the color tone of images displayed on the EVF close to the color tone of what looks like with the naked eye (the degree of the atmosphere of a light source color is increased), the light source color may remain considerably in not only the images that are displayed but also the still images that are recorded. That is, a technique is desired that reduces the color tone of a light source in a still image that is recorded, and also controls the color tone of the light source in images that are displayed on the EVF.

SUMMARY OF THE INVENTION

The present disclosure has been made in consideration of the aforementioned issues, and realizes a technique with which, even when the color tone of a light source in a still image that is recorded is reduced, it is possible to bring the color tone of the light source in an image that is displayed on the EVF close to the color tone of what looks like with the naked eyes.

In order to solve the aforementioned problems, one aspect of the present disclosure provides an image processing apparatus comprising: one or more processors; and a memory storing instructions which, when the instructions are executed by the one or more processors, cause the image processing apparatus to function as: an obtaining unit configured to obtain an image captured by an image capturing unit; a setting unit configured to be capable of setting a white balance recording mode that is applied to record the image as a still image and a white balance display mode that is applied to display the image before being captured as the still image on a display unit; and a control unit configured to control white balance correction performed on the image captured by the image capturing unit, wherein, in a case where a first display mode that is included in the display mode is set, the control unit sets an amount of a light source color that remains after the white balance correction is performed on the image before being captured as the still image in the first display mode to be larger than the amount of the light source color that remains after the white balance correction is performed on the still image in the recording mode.

Another aspect of the present disclosure provides, a control method of an image processing apparatus comprising: obtaining an image captured by an image capturing unit; setting a white balance recording mode that is applied to record the image as a still image and a white balance display mode that is applied to display the image before being captured as the still image on a display unit; and controlling white balance correction performed on the image captured by the image capturing unit, wherein, in the controlling, in a case where a first display mode that is included in the display mode is set, an amount of a light source color that remains after the white balance correction is performed on the image before being captured as the still image in the first display mode is set to be larger than the amount of the light source color that remains after the white balance correction is performed on the still image in the recording mode.

Still another aspect of the present disclosure provides a non-transitory computer-readable storage medium comprising instructions for performing a control method of an image processing apparatus, the control method comprising: obtaining an image captured by an image capturing unit; setting a white balance recording mode that is applied to record the image as a still image and a white balance display mode that is applied to display the image before being captured as the still image on a display unit; and controlling white balance correction performed on the image captured by the image capturing unit, wherein, in the controlling, in a case where a first display mode that is included in the display mode is set, an amount of a light source color that remains after the white balance correction is performed on the image before being captured as the still image in the first display mode is set to be larger than the amount of the light source color that remains after the white balance correction is performed on the still image in the recording mode.

According to the present invention, even when the color tone of a light source in a still image that is recorded is reduced, it is possible to bring the color tone of the light source in an image that is displayed on the EVF close to the color tone of what looks like with the naked eye.

Further features of the present invention will become apparent from the following description of exemplary embodiments (with reference to the attached drawings).

BRIEF DESCRIPTION OF THE DRAWINGS

FIG. 8 is a diagram illustrating a relationship between the remaining amount of the light source color and combinations of white balance modes according to the first embodiment.

DESCRIPTION OF THE EMBODIMENTS

Figure 1:
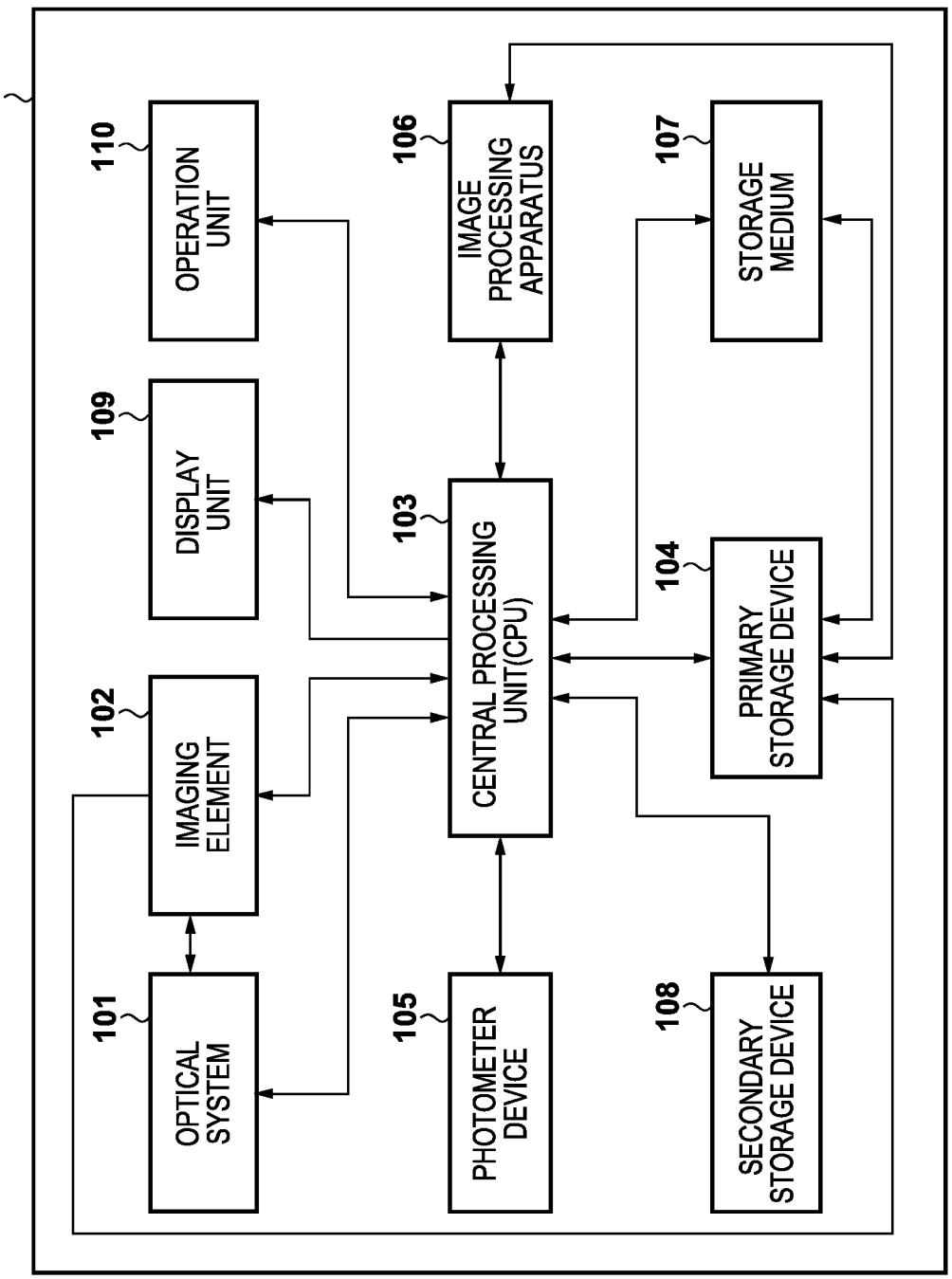
FIG. 1 is a block diagram showing an example of a functional configuration of a digital camera as an example of an image processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Hereinafter, an example will be described in which a digital camera that can capture still images as an example of an image processing apparatus. However, the present embodiment is not limited to a digital camera that can capture still images, and is also applicable to a digital camera that can capture moving images, and any of electronic devices such as a mobile phone and a computer that can capture images.

First Embodiment

Configuration of Digital Camera

FIG. 1 is a block diagram showing an example of a functional configuration of a digital camera as an example of an image processing apparatus according to the present embodiment. One or more functional blocks shown in FIG. 1 may be implemented using hardware such as an ASIC or a programmable logic array (PLA), or by a programmable processor such as a CPU or a GPU executing software. Alternatively, one or more functional blocks shown in FIG. 1 may be implemented by a combination of software and hardware. The processing operations described below may be performed mainly by the same hardware even when it is described that the processing operations are performed by different functional blocks.

An optical system 101 includes, for example, a lens, a shutter, and an aperture, and exposes an imaging element 102 with an optical image of a subject. The optical system 101 is configured to be capable of performing communication with a central processing unit (hereinafter, referred to simply as "CPU") 103, and transmits information regarding focal distance, the shutter speed, the aperture value, and the like to the CPU 103.

The imaging element 102 may be, for example, a CCD image sensor, a CMOS image sensor, or the like, and functions as an image capturing unit. The imaging element 102 includes, for example, an RGB Bayer pattern or the like, and converts an optical image imaged by the optical system 101 into luminance information on a pixel by pixel basis. The luminance information is digitized through an AD converter (not shown), and stored in a primary storage device 104 as RAW data before being subjected to development processing. The electrical gain (hereinafter, referred to simply as "ISO sensitivity") of the imaging element 102 is set by the CPU 103.

A photometer device 105 divides the RAW data into a plurality of photometric regions, and detects a subject luminance for each region from the amount of incident light by the optical system 101. The photometer device 105 transmits data regarding the detected subject luminance to the CPU 103.

The CPU 103 functions as a control unit of a digital camera 100. The CPU 103 controls the constituent units that constitute the digital camera 100 based on signals input from other structural elements and programs stored in advance in a secondary storage device 108 or the like, so as to implement various functions of the digital camera 100.

The primary storage device 104 is, for example, a volatile storage medium such as a RAM, and is used as a work memory by the CPU 103. Also, the information stored in the primary storage device 104 may be used by an image processing apparatus 106, or may be recorded in a storage medium 107.

The secondary storage device 108 is, for example, a nonvolatile storage device such as an EEPROM, and stores a program (firmware or an application) for controlling the digital camera 100 and various types of settings information. The program stored in the secondary storage device 108 is read and executed by the CPU 103. Also, the settings information stored in the secondary storage device 108 is also read and used by the CPU 103. Various setting values for image processing used in the present embodiment, which will be described later, are also stored in the secondary storage device 108.

The storage medium 107 is, for example, a nonvolatile storage medium such as a semiconductor memory, and records image data and the like that are obtained by image capturing and stored in the primary storage device 104. The storage medium 107 may be configured to be capable of being attached and detached to and from the digital camera 100 such as, for example, a semiconductor memory card. In this case, the data recorded in the storage medium 107 can be read by other devices such as a personal computer. As described above, the digital camera 100 may have at least one of the attaching/detaching mechanism and the reading/writing function of the storage medium 107.

A display unit 109 functions as display unit, and displays viewfinder images for capturing images, captured images, GUI images for interaction operations, and the like. The display unit 109 may include a plurality of display panels. For example, viewfinder images and captured images may be displayed on different display panels.

An operation unit 110 is a group of input devices that receives user operations and transmits input information to the CPU 103, and may include, for example, a button, a lever, a touch panel, and input devices that use voice, line of sight, and the like. The operation unit 110 also includes a release button for starting image capturing. The digital camera 100 of the present embodiment has a plurality of image processing patterns that are applied to captured images by the image processing apparatus 106, and any one of the patterns can be set as an image capturing mode from the operation unit 110.

The image processing apparatus 106 performs, on the RAW data before being subjected to development processing, image processing that is also referred to as "development processing" such as white balance processing, color interpolation processing for converting an RGB Bayer pattern signal to three RGB plain signals, gamma correction processing, chroma correction, hue correction, and the like. White balance computation performed in the present embodiment is also performed by the image processing apparatus 106. At least a portion of the functions of the image processing apparatus 106 may be implemented by the CPU 103 executing a program.

Configuration of Image Processing Apparatus

Figure 2:
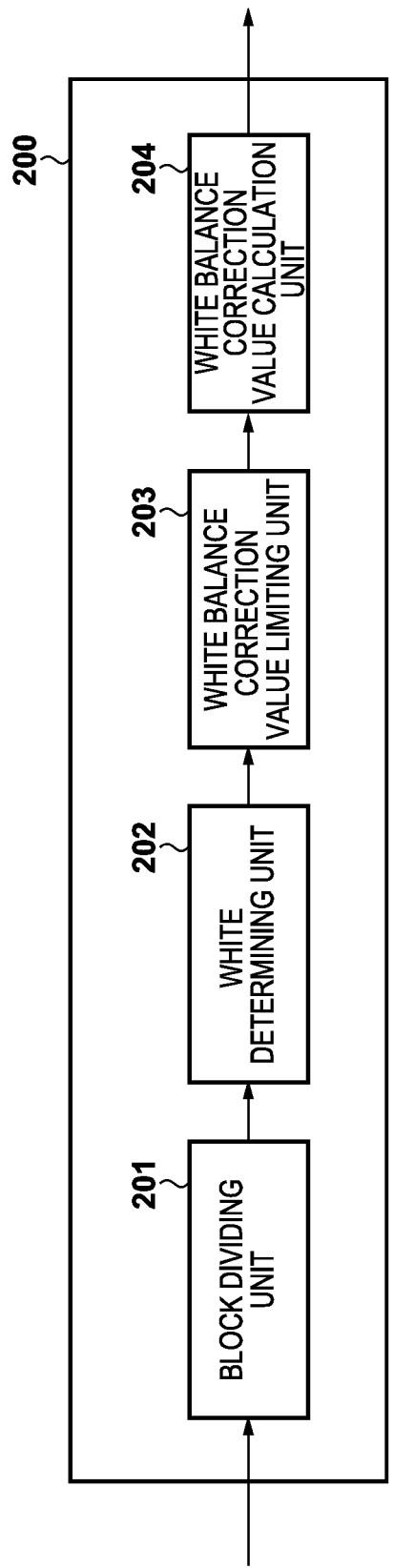
FIG. 2 is a block diagram showing an example of a functional configuration of a white balance control unit according to the first embodiment.

Next, an example of a configuration of a white balance control unit 200 that performs white balance processing will be described with reference to FIG. 2. The white balance control unit 200 shown in FIG. 2 is included in, for example, the image processing apparatus 106. The digital camera 100 of the present embodiment implements an auto white balance function of automatically computing the white balance according to the light source in a photographic scene by including the white balance control unit 200.

The white balance control unit 200 may be a circuit or a software module that performs auto white balance computation. The white balance control unit 200 includes a block dividing unit 201, a white determining unit 202, a white balance correction value limiting unit 203, and a white balance correction value calculation unit 204. Details of the processing performed in each block will be described later.

The digital camera 100 of the present embodiment has the following two display modes as operation modes for displaying images before being captured as still images on the display unit 109 as viewfinder images. One of the display modes is a mode (referred to as "still image recording equivalent display mode") for performing exposure control and controlling image processing operations such as white balance, gamma correction, and color correction processing, with which the viewfinder images have a finish similar to that of that captured still images. The other display mode is a mode (referred to as "naked eye view equivalent display mode") for performing exposure control and controlling image processing operations such as white balance, gamma correction, and color correction processing, with which the viewfinder images have a finish that is different from that of the captured still images and is close to what looks like with the naked eye. In the two display modes, different auto white balance computations are performed. Details of the two display modes will be described later.

Furthermore, the digital camera 100 also has, in addition to the two display modes described above, two still image recording modes as auto white balance modes that are applied to images that are recorded as still images. One of the still image recording modes is a mode (referred to as "white priority mode") for performing control so as to reduce the degree to which the atmosphere of the light source color is left in auto white balance applied to still images (also referred to as "the remaining amount of the light source color"). The other still image recording mode is a mode (referred to as "atmosphere priority mode") in which the remaining amount of the light source color applied to still images is set to be larger than that of the white priority mode.

In the case where the still image recording equivalent display mode is set, the image processing apparatus 106 performs, on images that are displayed on the display unit 109, auto white balance computation similar to that of the recording mode (the white priority mode or the atmosphere priority mode) that has been set. As a result, in the still image recording equivalent display mode, the digital camera 100 can output images (viewfinder images) with a color tone similar to that of still images that are output to the display unit 109 in the white priority mode or the atmosphere priority mode.

On the other hand, in the case where the naked eye view equivalent display mode is set, the image processing apparatus 106 performs auto white balance computation that is independent of the recording mode (the white priority mode or the atmosphere priority mode) that has been set. For example, the image processing apparatus 106 performs, on the images that are displayed on the display unit 109, auto white balance computation for leaving the light source color in an amount more than that in the case of the atmosphere priority mode, irrespective of the recording mode. As a result, the digital camera 100 can output, to the display unit 109, images with a color tone close to that of the ambient light source color that is viewed by the user (or in other words, the photographer) with the naked eye.

Series of Operations of Image Recording by Image Capturing

Next, a series of operations of image recording by image capturing will be described with reference to FIG. 3. The processing operations are implemented by the CPU 103 deploying a program stored in the secondary storage device 108 into the primary storage device 104, executing the program, and causing the imaging element 102, the image processing apparatus 106, and the like (including internal structural elements) to operate.

In S301, the CPU 103 receives a user input regarding image capturing from the operation unit 110. The user input includes, for example, inputs regarding various settings of the digital camera 100 such as the focal distance of the optical system 101, the shutter speed, the aperture value, the ISO sensitivity, the exposure correction amount setting, the manual exposure, and the auto exposure. Also, the display mode (the still image recording equivalent display mode or the naked eye view equivalent display mode) and the recording mode (the white priority mode or the atmosphere priority mode) are also set.

In S302, the CPU 103 performs photometric control for image capturing. For example, in the case where an auto exposure mode is set as a setting for image capturing in S301, the CPU 103 divides an image output from the imaging element 102 into n by m regions, where n represents the number of regions in the horizontal direction, and m represents the number of regions in the vertical direction. n and m may be any integers. In the present embodiment, for example, both n and m are 16. The CPU 103 divides the image into a total of 256 regions, and obtains an RGB signal from each of divided regions. Then, the CPU 103 calculates Y values from the RGB signals from the regions based on Equation 1, and further calculates the average value of the Y values of the regions to calculate the brightness of the subject.

$$Y = 3 \times R + 6 \times G + B \qquad \text{Equation 1}$$

By calculating the brightness of the subject, the CPU 103 can control the ISO sensitivity, the shutter speed, and the aperture value based on the calculated brightness of the subject such that the image displayed on the display unit 109 has a brightness designated by the user.

In S303, the CPU 103 adjusts the settings for image capturing. For example, the CPU 103 adjusts the settings such as the focal distance of the optical system 101, the shutter speed, the aperture value, and the ISO sensitivity of the imaging element 102 based on the settings information received in S301 and the brightness of the subject calculated in S302. In the case where a manual exposure mode is set in S301, exposure is controlled based on the ISO sensitivity, the shutter speed, and the aperture value that were designated by the user. However, in the case where the display mode is set to the naked eye view equivalent display mode, the CPU 103 operates such that the image displayed on the display unit 109 is in the auto exposure mode even when the manual exposure mode has been set. At this time, for exposure at the time of still image recording in S310, which will be described later, the CPU 103 performs image capturing based on the settings designated by the user as manual exposure settings.

In S304, the CPU 103 controls the imaging element 102 for image capturing. For example, the CPU 103 further adjusts the settings (ISO sensitivity and the like) of the imaging element 102 based on the settings information for image capturing adjusted in S303, and performs image capturing processing. In S305, the CPU 103 performs focus control. For example, the CPU 103 performs auto focus control based on the captured image so as to focus at a focus position at which the contrast is highest. The auto focus control can be performed using a known method. The above-described order in which S302 to S305 are performed is merely an example, and thus the present embodiment is not limited to this order. The order in which S302 to S305 are performed may be changed according to the processing.

In S306, the CPU 103 calculates white balance correction values for the captured image using the image processing apparatus 106. Details of the white balance correction value calculation will be given later after a flow of a series of image capturing operations performed until S314 is described.

In S307, the CPU 103 performs development processing. For example, the CPU 103 controls the image processing apparatus 106 to perform development processing operations such as white balance correction processing using the white balance correction value calculated in S306, color interpolation processing, gamma correction processing, chroma correction processing, and hue correction processing. Then, in S308, the CPU 103 displays the image developed in S307 on the display unit 109.

In S309, the CPU 103 determines whether a user instruction to start still image capturing has been received by the operation unit 110. For example, if it is determined based on the user input received by the operation unit 110 that the instruction to start still image capturing has not been received, the CPU 103 returns the processing to S302, and repeats the operations from S302 to S308. On the other hand, if it is determined based on the user input received by the operation unit 110 that the instruction to start still image capturing has been received, the CPU 103 advances the processing to S310, and transitions into still image capturing control.

In S310, the CPU 103 captures a still image based on the settings for still image capturing such as the ISO sensitivity, the shutter speed, and the aperture value. In the case where the manual exposure mode is set, the CPU 103 may set the ISO sensitivity, the shutter speed, and the aperture value to be the same as the setting values calculated in S302. Also, in the case where the auto exposure mode is set, the CPU 103 may set the ISO sensitivity and the like to be the same as the setting values calculated in S302, or may separately calculate the settings for still image capturing when calculation is performed in the photometric control in S302 and use the calculated setting values. In S311, the CPU 103 stores the image captured in S310 in the primary storage device 104.

In S312, the CPU 103 calculates white balance correction values for the image stored in the primary storage device 104 in S311. In the white balance correction value calculation performed here, white balance correction values that correspond to either one of the white priority mode and the atmosphere priority mode of the recording mode that has been set are calculated. Details thereof will be described later.

In S313, the CPU 103 performs development processing. For example, the CPU 103 controls the image processing apparatus 106 to perform development processing operations such as white balance correction processing that uses the white balance correction value calculated in S312, color interpolation processing, gamma correction processing, chroma correction processing, and hue correction processing. Then, in S314, the CPU 103 records the image developed in S313 in the storage medium 107. After that, the CPU 103 ends the series of operations.

White Balance Correction Value Calculation Processing

Figure 4:
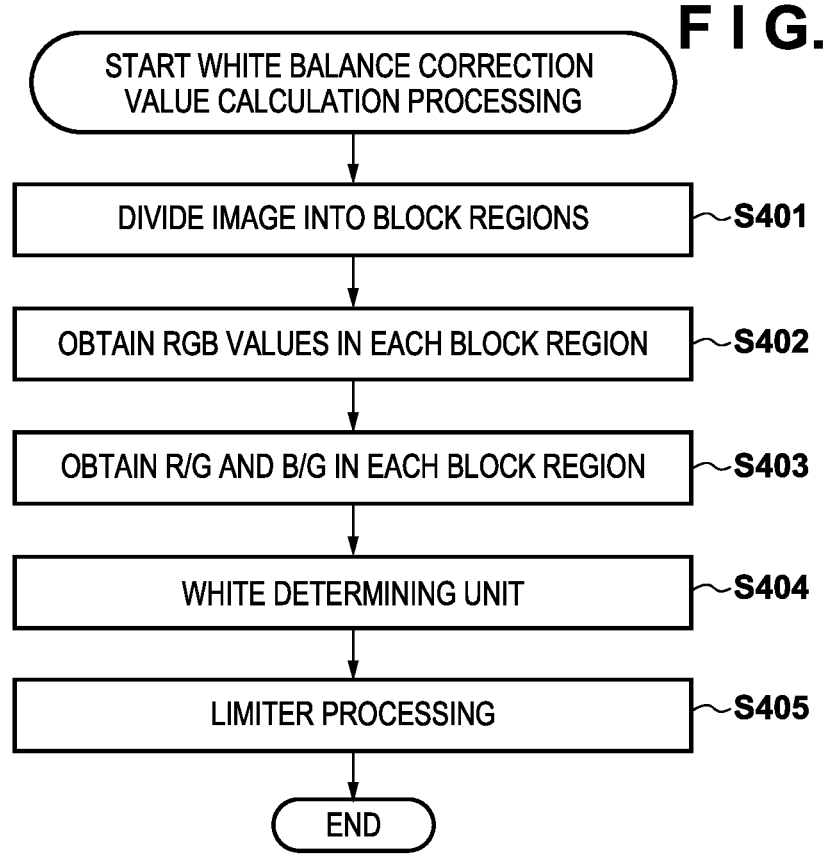
FIG. 4 is a flowchart illustrating a series of operations of white balance correction value calculation processing according to the first embodiment.

Next, a detailed description of the white balance correction value calculation processing (in S306 and S312) described above will be given with reference to FIG. 4. The processing is implemented by the CPU 103 executing a program stored in the secondary storage device 108, or by the CPU 103 controlling the image processing apparatus 106.

In S401, the CPU 103 divides the captured image into block regions using the block dividing unit 201 of the image processing apparatus 106. For example, the CPU 103 divides, using the block dividing unit 201, the captured image into n by m regions, where n represents the number of regions in the horizontal direction, and m represents the number of regions in the vertical direction. n and m may be any integers. In the present embodiment, for example, both n and m are 16. That is, the block dividing unit 201 divides the image into a total of 256 regions. In the following description, the divided regions will be referred to as "block divided regions".

In S402, the CPU 103 obtains Rave, Gave, and Bave that represent the average values of R, G, and B signals in each block divided region based on the following Equation 2.

$$Rave = Rall/Rcount$$

$$Gave = Gall/Gcount$$

$$Bave = Ball/Bcount \qquad \text{Equation 2}$$

Here, Rall, Gall, and Ball represent the integrated values of R, G, and B signals in each block divided region. Rcount, Gcount, and Bcount respectively represent the number of R signals, the number of G signals, and the number of B signals in each block divided region.

In S403, the CPU 103 calculates the R and B signals normalized by the G signals (R/G value and B/G value) in each block divided region based on Equation 3.

$$R/G = Rave/Gave$$

$$B/G = Bave/Gave \quad \text{Equation 3}$$

In S404, the CPU 103 performs white determining processing using the white determining unit 202 of the image processing apparatus 106. Specifically, the white determining unit 202 extracts blocks plotted within a white detection range 907 shown in FIG. 5 for the R/G and B/G values in each block region. Here, the white detection range 907 will be described in detail with reference to FIG. 5.

Figure 5:
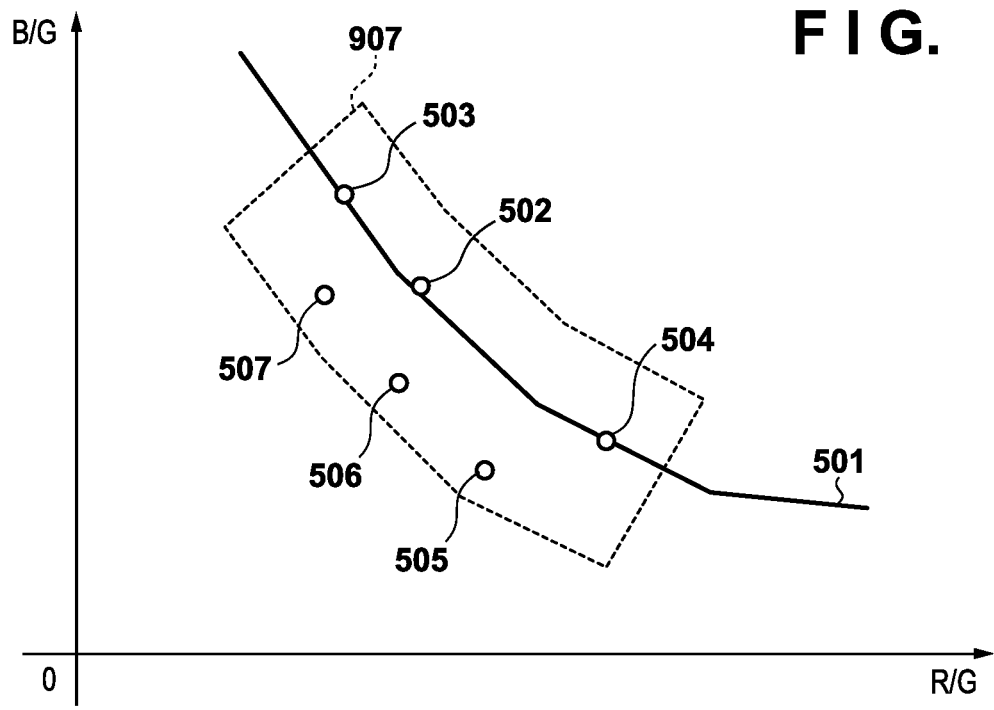
FIG. 5 is a diagram illustrating a white detection range according to the first embodiment.

Reference numeral 501 shown in FIG. 5 indicates a plotted position of a light source on a black body radiation trajectory (also referred to as "black body emission trajectory") in a graph with the x axis representing R/G and the y axis representing B/G. Also, reference numerals 502 to 507 schematically indicate examples of plotted positions of various types of light sources in the coordinate system shown in FIG. 5. Reference numeral 502 indicates an example of a plotted position of sunlight (about 5200 kelvin (hereinafter, simply indicated by K)), reference numeral 503 indicates an example of a plotted position of shade (about 7000 K), reference numeral 504 indicates an example of a plotted position of a light bulb color light source (about 2800 K), reference numeral 505 indicates an example of a plotted position of a white fluorescent light, reference numeral 506 indicates an example of a plotted position of a daylight white fluorescent light, and reference numeral 507 indicates an example of a plotted position of a daylight color fluorescent light. The white detection range 907 is set so as to include the light sources on the black body radiation trajectory and the fluorescent light sources that are indicated by reference numerals 502 to 507. As a result of the white detection range 907 being set in the manner described above, by using a known auto white balance method, it is possible to extract pixels that may have light source colors in the image region and correct white balance by changing the pixel values of the extracted pixels to achromatic color.

Next, the white determining unit 202 calculates, for each block plotted in the white detection range 907, RaveAll, GaveAll, and BaveALL that represent the average values of Rave, Gave, and Bave that represent the average values of R, G, and B signals in the block based on Equation 4.

$$RaveALL = (Rave \text{ integrated value of extracted blocks})/(\text{the number of extracted blocks})$$

$$GaveALL = (Gave \text{ integrated value of extracted blocks})/(\text{the number of extracted blocks})$$

$$BaveALL = (Bave \text{ integrated value of extracted blocks})/(\text{the number of extracted blocks}) \quad \text{Equation 4}$$

If no block is plotted within the white detection range 907, the white determining unit 202 calculates the average values RaveAll, GaveAll, and BaveALL using Rave, Gave, and Bave that represent the average values of R, G, and B signals in all blocks. Then, the white determining unit 202 calculates R/Gall and B/Gall, which are the R and B signals normalized by the G signals, based on Equation 5.

$$R/Gall = RaveALL/GaveALL$$

$$B/Gall = BaveALL/GaveALL \quad \text{Equation 5}$$

Through the processing up to here, a pair of R and B signals normalized by G signals (or in other words, one point within a plane based on B/G and R/G) is calculated. The white determining unit 202 ends the white determining processing in S402.

In the present embodiment, as described above, an example of a method for extracting pixels that may have light source colors from an image has been described. However, the method for determining the values corresponding to R/Gall and B/Gall is not limited thereto, and any other method may be used. For example, a method may be used in which the values corresponding to R/Gall and B/Gall are obtained directly from an image by using deep learning that is an example of machine learning. For example, a deep neural network may be trained using pairs of images and values of R/Gall and B/Gall that correspond to the images as teacher data. Then, by inputting an image to the trained deep neural network, estimated values of R/Gall and B/Gall can be obtained.

In S405, the CPU 103 performs limiter processing using the white balance correction value limiting unit 203 of the image processing apparatus 106. The limiter processing in S405 is processing for limiting the amount of correction of the white balance correction value in order to leave the light source color as white balance for the pair of R/Gall and B/Gall calculated in S404. Hereinafter, the limiter processing will be described in detail with reference to FIGS. 6A to 6D.

Figure 6A:
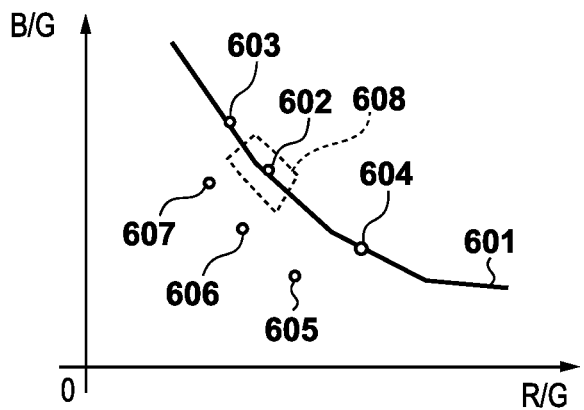
FIGS. 6A to 6D are diagrams illustrating limiter control frames according to the first embodiment.

FIG. 6A shows an example of a limiter control frame 608 used in the limiter processing. Reference numeral 601 shown in FIG. 6A indicates a plotted position of a light source on a black body radiation trajectory in a graph with the x axis representing R/G and the y axis representing B/G, as with reference numeral 501 shown in FIG. 5. Also, reference numerals 602 to 607 indicate plotted positions of light sources on the black body radiation trajectory and fluorescent light sources (sunlight, shade, a light bulb color light source, a white fluorescent light, a daylight white fluorescent light, and a daylight color fluorescent light in this order), which are indicated by reference numerals 502 to 507 in FIG. 5.

In the case where R/Gall and B/Gall calculated in S404 are plotted outside the limiter control frame 608, R/Gall and B/Gall are moved to positions on the closest limiter control frame. Then, R/Gall_Limit and B/Gall_Limit, which will be R/Gall and B/Gall after the limiter processing, are calculated. In the example shown in FIG. 6A, reference numerals 603 to 607 are plotted outside the limiter control frame 608. Accordingly, in the case where R/Gall and B/Gall calculated in S404 are plotted at the same position as any of the plotted positions 603 to 607, R/Gall_Limit and B/Gall_Limit are calculated. On the other hand, reference numeral 602 is plotted within the limiter control frame 608, and thus in the case where R/Gall and B/Gall are plotted at the same position as reference numeral 602, it is unnecessary to perform the moving processing described above.

When the limiter processing ends, the CPU 103 calculates, using the white balance correction value calculation unit 204, R gain, G gain, and B gain that represent the final white balance correction values (gains applied to R, G, and B signals) based on Equation 6. As a result, through the white balance correction, for the light source 602, the light source color does not remain, and for each of the light sources 603 to 607, the light source color remains.

$$Rgain = 1/(R/Gall\_Limit)$$

$$Ggain = 1$$

$$Bgain = 1/(B/Gall\_Limit) \quad \text{Equation 6}$$

Here, a description will be given of processing for leaving the light source color for the auto white balance mode in the display mode (the still image recording equivalent display mode or the naked eye view equivalent display mode) and the recording mode (the white priority mode or the atmosphere priority mode) according to the present embodiment. The limiter control frame 608 is set such that the size of the area varies according to the brightness. That is, the limiter control frame 608 is set to have a smaller area as the brightness is higher, and is set to have a larger area as the brightness is lower. The brightness used here is the brightness of the subject calculated in photometric control in S302. The reason that the limiter control frame is set to have a smaller area as the brightness is higher is as follows. When the brightness is high, it is highly likely that the light source is outdoor sunlight. For this reason, it is unnecessary to perform white balance correction for light sources other than sunlight. Also, it is possible to reduce erroneous corrections and overcorrections of white balance that are caused as a result of the color of the subject being erroneously detected as the light source color in the above-described white determining processing.

Figure 6B:
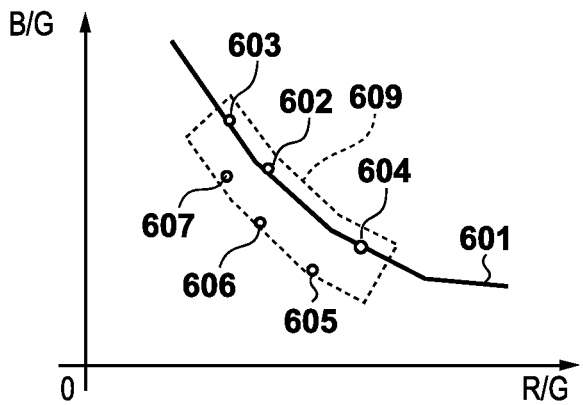

The limiter control frame 608 shown in FIG. 6A was given as an example of a limiter control frame when the brightness is high in the white priority mode, whereas FIG. 6B shows an example of a limiter control frame 609 when the brightness is low in the white priority mode. When the brightness is low, the light sources 602 to 607 are set to be plotted within the limiter control frame 609. As a result, for each of the light sources 602 to 607, the light source color does not remain after the white balance correction. The limiter control frame when the brightness is high may be used in common in the auto white balance mode in the display mode (the still image recording equivalent display mode and the naked eye view equivalent display mode) and the recording mode (the white priority mode and the atmosphere priority mode). On the other hand, when the brightness is low, the limiter control frame is changed in each mode. That is, in the present embodiment, if the brightness is greater than or equal to a brightness threshold value, the color temperature (or in other words, the amount of the light source color that remains after the white balance correction) of the limiter control frame is set to be the same between display modes. On the other hand, when the brightness is lower than the brightness threshold value, the color temperature (the amount of the light source color that remains after the white balance correction) of the limiter control frame is changed between modes. At this time, the brightness threshold value is set to a brightness at which, for example, the color temperature is 5000 K in FIGS. 7A to 7D, which will be described below.

Figure 7A:
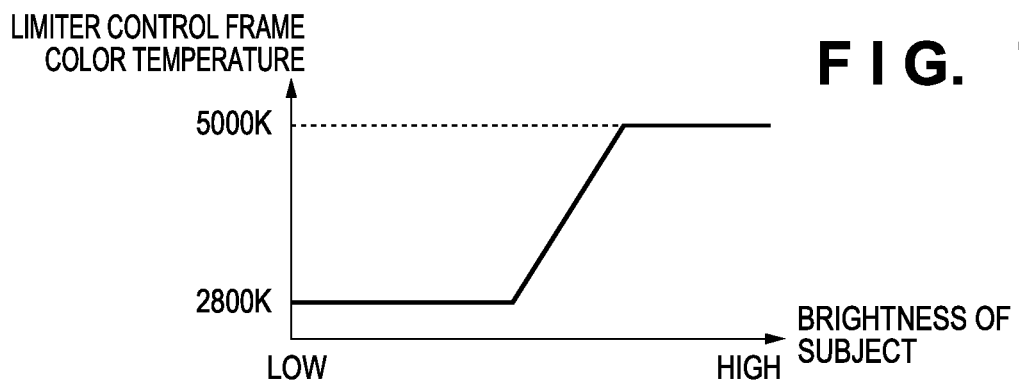
FIGS. 7A to 7D are diagrams illustrating control of the limiter control frames according to the first embodiment.

FIG. 7A shows an example of control on the low color temperature side of the limiter control frame according to the brightness in the white priority mode of the recording mode. In FIGS. 7A to 7D, the x axis represents brightness, and the y axis represents the plotted position of the color temperature on the low color temperature side of the limiter control frame. FIG. 7A shows an example in which, when the brightness of the subject is high, the color temperature of the limiter control frame is set to 5000 K, and the color temperature is gradually reduced to 2800 K as the brightness decreases. 5000 K shown in FIG. 7A is a color temperature that corresponds to the low color temperature side of the limiter control frame 608 when the brightness is high, which was shown in FIG. 6A. Also, 2800 K shown in FIG. 7A is a color temperature that corresponds to the low color temperature side of the limiter control frame 609 when the brightness is low, which was shown in FIG. 6B. The high color temperature side of the limiter control frame and the fluorescent light side relative to the black body radiation trajectory (on the origin side relative to the black body radiation trajectory) can also be controlled such that the color temperature is gradually changed according to the brightness, as with the control on the low color temperature side of the limiter control frame.

Figure 6C:
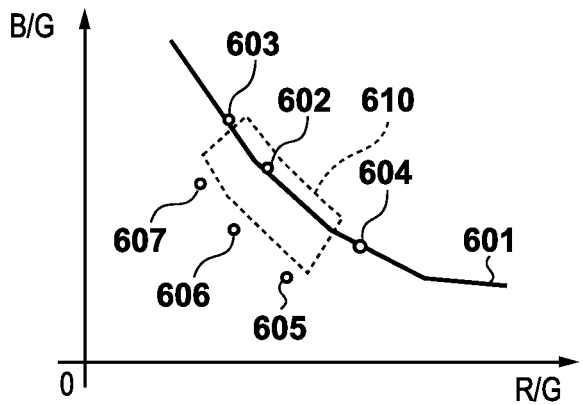

FIG. 6C shows an example of a limiter control frame 610 when the brightness is low in the atmosphere priority mode of the recording mode. When the brightness is low in the atmosphere priority mode, the limiter control frame 610 is set such that the light sources 603 to 607 are located at positions slightly outside the limiter control frame 610. As a result, for each of the light sources 603 to 607, a small amount of the light source color remains after the white balance correction.

Figure 7B:
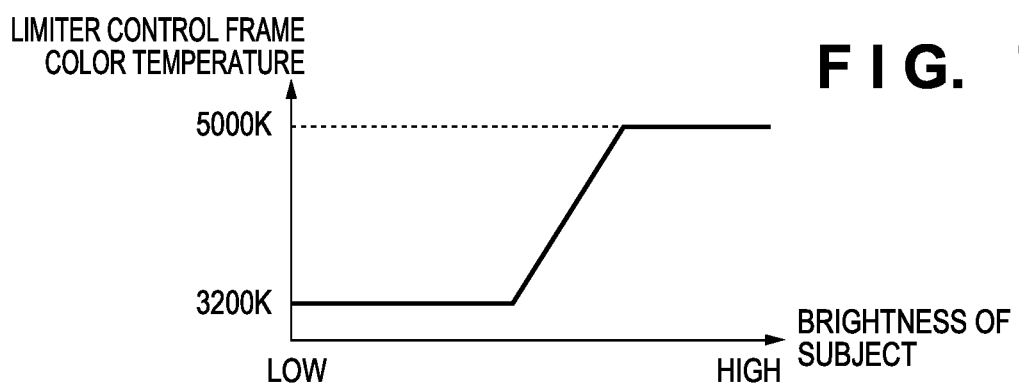

FIG. 7B is a diagram showing control on the low color temperature side of the limiter control frame according to the brightness in the atmosphere priority mode. FIG. 7B shows an example in which, when the brightness is high, the color temperature is set to 5000 K, and the color temperature is gradually reduced to 3200 K as the brightness decreases. 5000 K shown in FIG. 7B is a color temperature that corresponds to the low color temperature side of the limiter control frame 608 when the brightness is high, which was shown in FIG. 6A. Also, 3200 K shown in FIG. 7B is a color temperature that corresponds to the low color temperature side of the limiter control frame 610 when the brightness is low, which was shown in FIG. 6C.

As described above, in the case where the still image recording equivalent display mode of the display mode is selected, the CPU 103 sets a limiter control frame that corresponds to either one of the white priority mode and the atmosphere priority mode of the recording mode that has been set, and computes white balance correction values. That is, in the case where the still image recording equivalent display mode is set as the display mode, the amount of the light source color that remains after the white balance correction has been performed on the image is set to be equal to the amount of the light source color that remains after the white balance correction has been performed on the still image in the recording mode.

On the other hand, in the case where the naked eye view equivalent display mode of the display mode is selected, the CPU 103 sets a limiter control frame that is different from the limiter control frame that is set in the recording mode (the white priority mode and the atmosphere priority mode).

Figure 6D:
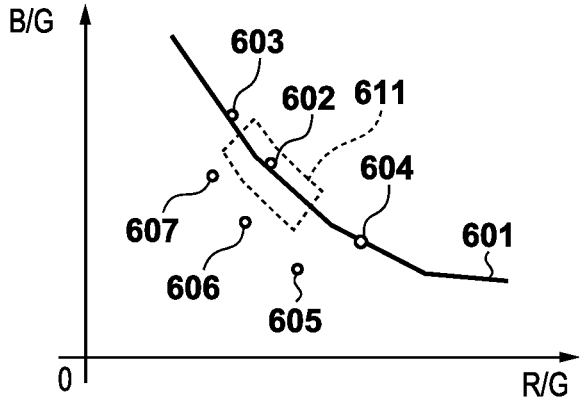

FIG. 6D shows a limiter control frame 611 when the brightness is low in the naked eye view equivalent display mode. When the brightness is low in the naked eye view equivalent display mode, the limiter control frame 611 is set to have a smaller area than the limiter control frame 610 that is set when the brightness is low in the atmosphere priority mode. As a result, the light sources 603 to 607 are significantly spaced apart from the limiter control frame, and for each of the light sources 603 to 607, a large amount of the light source color remains after the white balance correction. As described above, the limiter control frame 608 shown in FIG. 6A is a limiter control frame when the brightness is high, and thus in the naked eye view equivalent display mode as well, the limiter control frame when the brightness is high is used in common in the two recording modes.

Figure 7C:
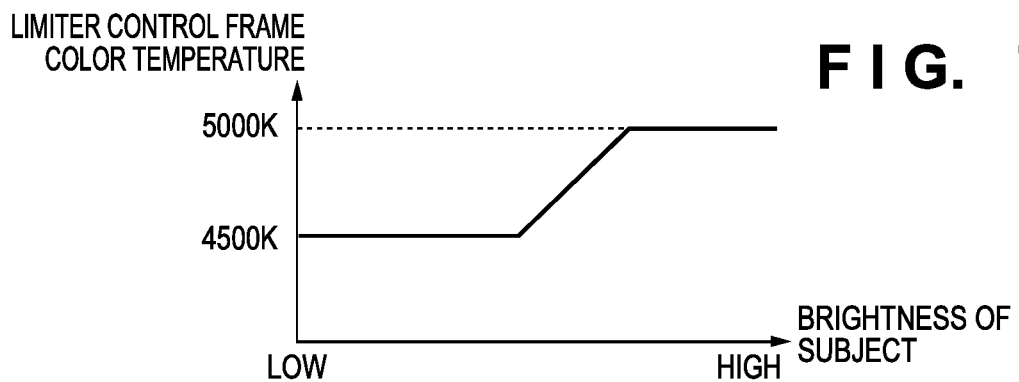

FIG. 7C shows control on the low color temperature side of the limiter control frame according to the brightness in the naked eye view equivalent display mode. FIG. 7C shows an example in which, when the brightness is high, the color temperature is set to 5000 K, and the color temperature is gradually reduced to, for example, 4500 K as the brightness decreases. 5000 K shown in FIG. 7C is a color temperature that corresponds to the low color temperature side of the limiter control frame 608 when the brightness is high, which was shown in FIG. 6A. Also, 4500 K shown in FIG. 7C is a color temperature that corresponds to the low color temperature side of the limiter control frame 611 when the brightness is low, which was shown in FIG. 6D. As described above, in the case where the naked eye view equivalent display mode is set as the display mode, the amount of the light source color that remains after the white balance correction has been performed on the image is set to be larger than the amount of the light source color that remains after the white balance correction has been performed on the still image in the recording mode.

By controlling the limiter control frame as described above, the light source color remains more in the naked eye view equivalent display mode, and it is therefore possible to achieve a display closer to what looks like with the naked eye as compared with the display in the still image recording equivalent display mode.

Hereinafter, additional processing performed in the naked eye view equivalent display mode will be described. The brightness of the image displayed on the viewfinder can be set to be higher than that when viewed with the naked eye by setting the ISO sensitivity to be high and the shutter speed to be slow when capturing the image. Accordingly, the user can recognize a dark subject that cannot be recognized with the naked eye by looking at the viewfinder. However, when the limiter control in the naked eye view equivalent display mode is performed such that the light source color remains under conditions where the display on the viewfinder is brighter than that when viewed with the naked eye, such as a nighttime scene, a problem arises in that the light source color appears to remain more than that when viewed with the naked eye.

Figure 7D:
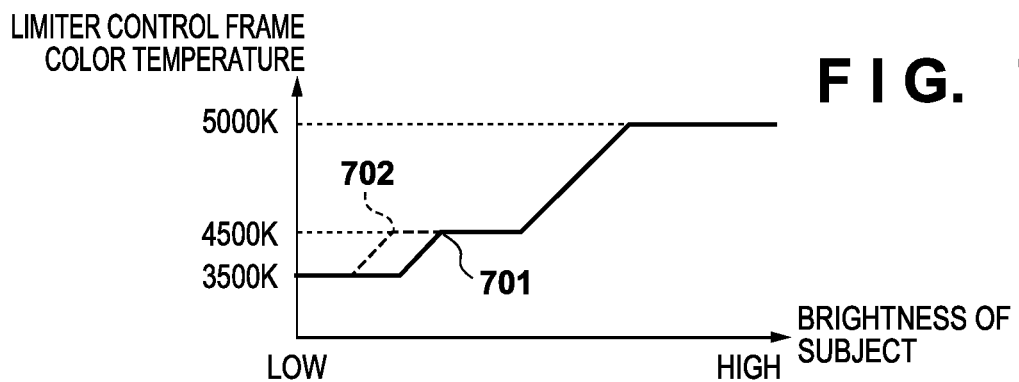

In view of this, in the present embodiment, the above-described problem is solved by performing processing (limiter control range enlarging processing) for enlarging the limiter control range under conditions where the brightness of the subject on the viewfinder appears to be higher than that when viewed with the naked eye. FIG. 7D shows an example of color temperature change control that corresponds to the low color temperature side of the limiter control frame in the naked eye view equivalent display mode in the case where the limiter control range enlarging processing is added. The brightness of the subject that corresponds to a point indicated by reference numeral 701 shown in FIG. 7D is a brightness at which the image displayed on the viewfinder starts to be brighter than that when viewed with the naked eye. The shutter speed when capturing the image displayed on the viewfinder cannot be set to be slower than the frame rate of the image displayed on the viewfinder. For this reason, when the frame rate changes, the brightness of the subject at which the image displayed on the viewfinder can be set to be brighter than that when viewed with the naked eye (or in other words, the point 701) also changes. Likewise, when the maximum value of the ISO sensitivity of the image displayed on the viewfinder changes, the brightness of the subject at which the image displayed on the viewfinder can be set to be brighter than that when viewed with the naked eye also changes.

In this case, in the present embodiment, a predetermined brightness threshold value (the point of the brightness of the subject (the point 701)) for changing the color temperature of the limiter control frame is changed according to the settings of the digital camera such as the ISO sensitivity of the image displayed on the viewfinder. Then, the CPU 103 compares the brightness of the subject included in the image with the threshold value. In the manner described above, by changing the point of the brightness of the subject according to the frame rate of the viewfinder, the maximum ISO sensitivity of the image displayed on the viewfinder, and the like, the limiter control frame can be changed as appropriate irrespective of the conditions such as the frame rate and the maximum ISO sensitivity when image capturing is performed.

In FIG. 7D, a broken line 702 shows an example in which the frame rate of the viewfinder is reduced relative to that of the point 701, or the maximum ISO sensitivity of the image displayed on the viewfinder is higher than that of the point 701. FIG. 7D shows only two patterns including the point 701 and the broken line 702, but a configuration may be used in which the pattern is more finely divided according to the conditions such as the frame rate or the maximum ISO sensitivity. Also, in the description given above, an example was described in which the color temperature that corresponds to the low color temperature side of the limiter control frame is changed. However, with respect to the other side, under conditions where the brightness of the subject on the viewfinder appears to be higher than that when viewed with the naked eye, control can be performed so as to enlarge the limiter control frame.

In short, the relationship of the remaining amount of the light source color described up to here can be shown in FIG. 8. FIG. 8 shows combinations of the white balance mode for still image recording and the white balance mode for viewfinder displaying in the case where the limiter processing in the auto white balance mode is performed.

The combinations shown in FIG. 8 will be described sequentially from the top row. First, when the still image recording mode is set to "atmosphere priority mode" and the viewfinder display mode is set to "naked eye view equivalent display mode", the light source color remains more in the viewfinder display mode than in the still image recording mode. That is, when the naked eye view equivalent display mode (a first display mode) is set, the amount of the light source color that remains after the white balance correction in the naked eye view equivalent display mode is larger than the amount of the light source color that remains after the white balance correction in the recording mode.

As the second combination, when the still image recording mode is set to "atmosphere priority mode", and the viewfinder display mode is set to "still image recording equivalent display mode", the amount of the light source color that remains after the white balance correction is the same in the viewfinder display mode and the still image recording mode. That is, when the still image recording equivalent display mode (a second display mode) is set, the amount of the light source color that remains after the white balance correction in the still image recording equivalent display mode is equal to the amount of the light source color that remains after the white balance correction in the recording mode.

As the third combination, when the still image recording mode is set to "white priority mode", and the viewfinder display mode is set to "naked eye view equivalent display mode", the light source color remains more in the viewfinder display mode than in the still image recording mode. Furthermore, as the fourth combination, when the still image recording mode is set to "white priority mode", and the viewfinder display mode is set to "still image recording equivalent display mode", the remaining amount of the light source color is the same in the viewfinder display mode and the still image recording mode.

In the four combinations described above, the remaining amount of the light source color is larger in "atmosphere priority mode" of the recording mode than in "white priority mode" of the recording mode. For this reason, the amount of the light source color that remains after the white balance correction is larger when the combination of the naked eye view equivalent display mode and the atmosphere priority mode is set than that when the combination of the naked eye view equivalent display mode and the white priority mode is set. Also, the amount of the light source color that remains after the white balance correction is larger when the combination of the still image recording equivalent display mode and the atmosphere priority mode is set than that when the combination of the still image recording equivalent display mode and the white priority mode is set.

Through the processing described above, the white balance correction value calculation processing in S306 ends. The white balance correction value calculation processing for the still image performed in S312 is the same as that of control performed in the white priority mode or the atmosphere priority mode of the recording mode, and thus a redundant description will be omitted.

As described above, the present embodiment is configured to be capable of setting a white balance recording mode that is applied to record the image as a still image and a white balance display mode that is applied to display the image before capturing as the still image on the display unit. When "naked eye view equivalent display mode" of the display mode is set, the amount of the light source color that remains after the white balance correction in the image before being captured as a still image is set to be larger than the that in the still image in the recording mode. In this way, the image displayed on the EVF can be brought closer to the colors viewed with the naked eye while keeping the colors of the still image that is recorded to appropriate colors such that the color tone of the light source does not remain excessively. In other words, even when the color tone of the light source in the still image that is recorded is reduced, it is possible to bring the color tone of the light source in the image that is displayed on the EVF close to the color tone of what looks like with the naked eye.

Second Embodiment

Next, a second embodiment will be described. The first embodiment is configured such that white balance correction values are calculated based on, out of pixel information regarding divided blocks of a captured image, pixel information regarding some of the divided blocks of the captured image that are included in a white determining region, and the white balance correction values are corrected according to the display mode. On the other hand, the second embodiment is configured such that the white balance correction values are corrected using a table in which white balance correction values are arranged according to the light source. The structural elements of an image processing apparatus and white balance correction value calculation processing according to the present embodiment are different from those of the first embodiment, but other structural elements and processing operations are the same or substantially the same as those of the first embodiment. For this reason, structural elements and processing operations that are the same or substantially the same are given the same reference numerals, and a description thereof will be omitted, and only differences will be mainly described.

Configuration of Image Processing Apparatus

Figure 9:
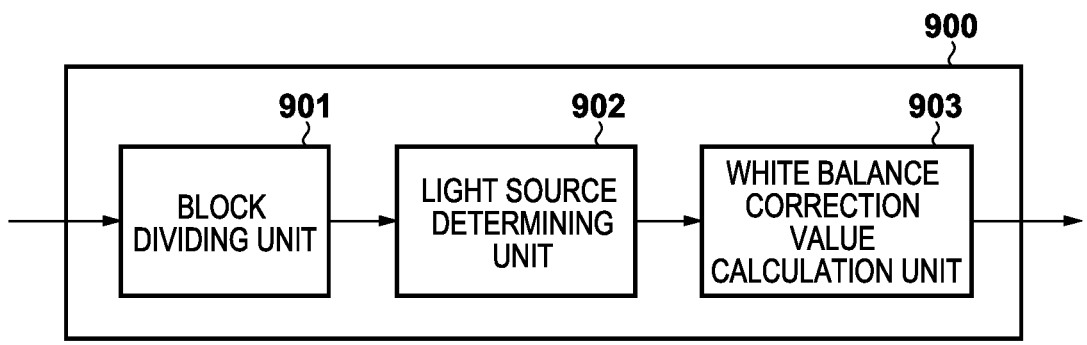
FIG. 9 is a block diagram showing an example of a functional configuration of a white balance control unit according to a second embodiment.

FIG. 9 shows an example of a configuration of a white balance control unit 900 according to the second embodiment. The white balance control unit 900 is included in the image processing apparatus 106, and performs white balance processing. The white balance control unit 900 may be a circuit or a software module that performs auto white balance computation. The white balance control unit 900 includes a block dividing unit 901, a light source determining unit 902, and a white balance correction value calculation unit 903. The processing performed in each block will be described later.

Series of Operations of Image Recording by Image Capturing

Figure 10:
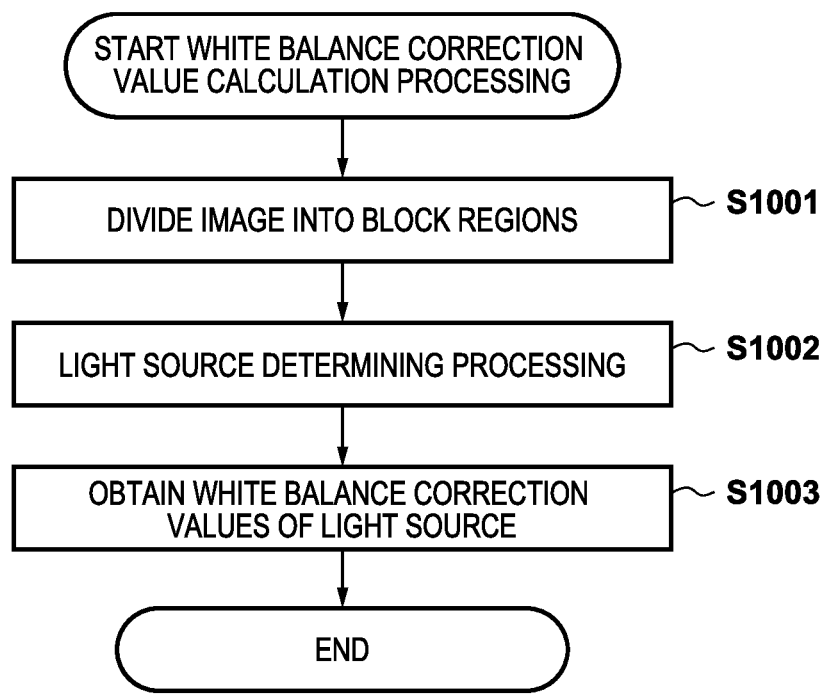
FIG. 10 is a flowchart illustrating a series of operations of white balance correction value calculation processing according to the second embodiment.

Next, a series of operations of image recording by image capturing will be described with reference to FIGS. 3 and 10. The processing operations are implemented by the CPU 103 deploying a program stored in the secondary storage device 108 into the primary storage device 104 and executing the program, and causing the imaging element 102, the image processing apparatus 106, and the like (including internal structural elements) to operate.

Figure 3:
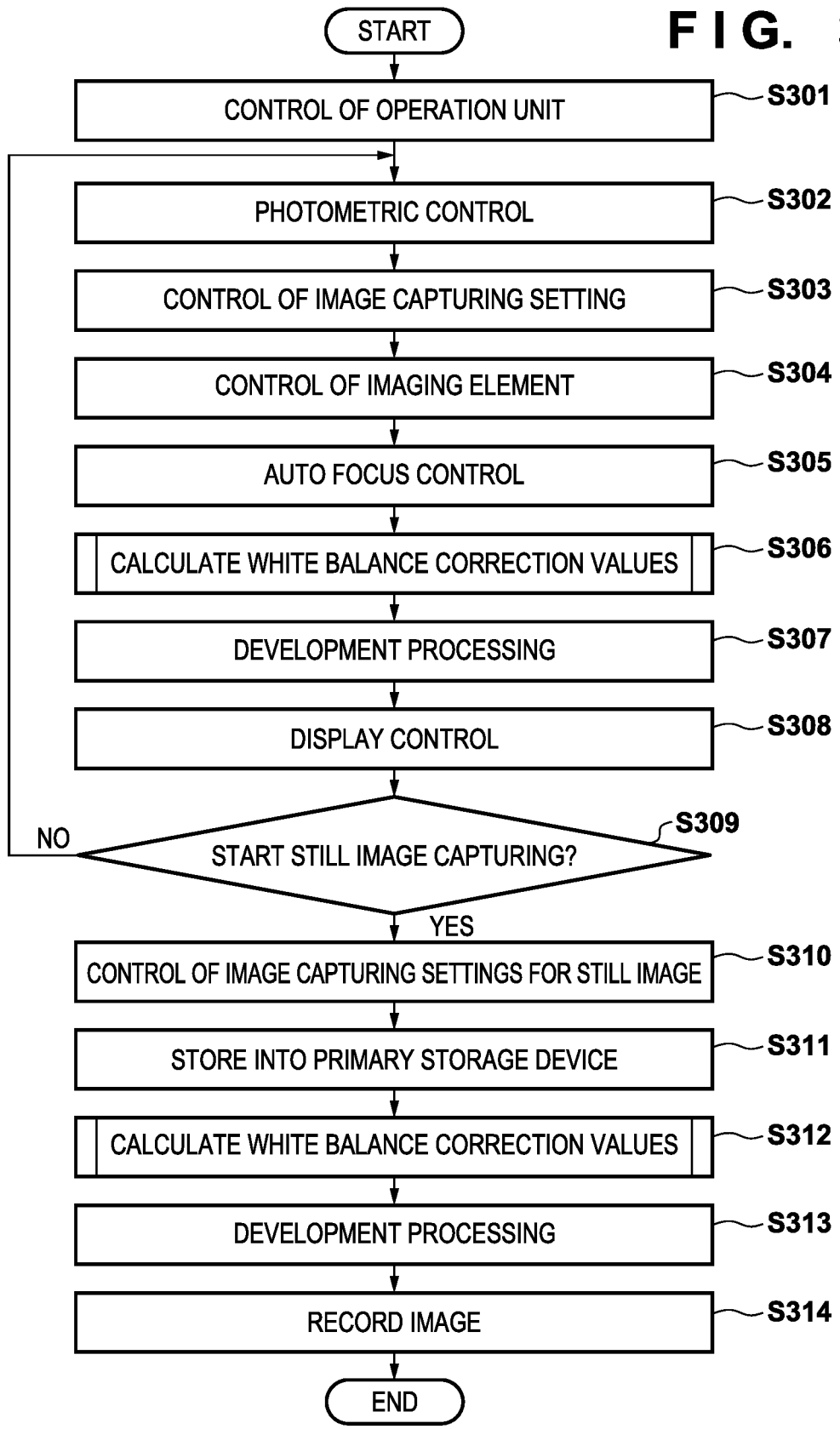
FIG. 3 is a flowchart illustrating a series of operations of image capturing processing according to the first embodiment.

The CPU 103 performs the processing operations of S301 to S314 shown in FIG. 3 in the same manner as in the first embodiment. In the present embodiment, the white balance correction value calculation processing performed in S306 and S312 is different from that of the first embodiment. Accordingly, this processing will be described with reference to FIG. 10. In the second embodiment, the secondary storage device 108 stores white balance correction values according to various light sources are stored in the form of a table. In the table, Rgain, Ggain, and Bgain that represent white balance correction values (the gains applied to R, G, and B signals) that correspond to the white priority mode, the atmosphere priority mode, and the naked eye view equivalent display mode are stored according to the light source.

Furthermore, for the naked eye view equivalent display mode of the display mode, two types of white balance correction values are stored: white balance correction values used when the brightness of the image displayed on the viewfinder is higher than that when viewed with the naked eye and white balance correction values used when the brightness of the image displayed on the viewfinder is the same as that when viewed with the naked eye. At this time, the white balance correction values of the light sources are set such that the remaining amount of the light source color increases in the following order: the naked eye view equivalent display mode, the atmosphere priority mode, and the white priority mode. Also, in the naked eye view equivalent display mode, the white balance correction values used when the brightness of the image displayed on the viewfinder is the same as that when viewed with the naked eye are set such that the amount of the light source color remains more than those used when the brightness of the image displayed on the viewfinder is higher than that when viewed with the naked eye.

In S1001, as in the first embodiment, the CPU 103 divides, using the block dividing unit 901, the captured image into n by m regions, where n represents the number of regions in the horizontal direction, and m represents the number of regions in the vertical direction. n and m may be any integers. In the present embodiment, both n and m are 16, and the image is divided into a total of 256 regions.

In S1002, the CPU 103 performs light source determining processing using the light source determining unit 902. The light source determining processing is performed using the color distribution of block division data created in S1001 and information regarding the brightness of the subject calculated in S302. The light source determining processing is performed by selecting, based on the color distribution of the block division data and the information regarding the brightness of the subject, a light source with the closest features from among the color distribution of the block division data and the information regarding the brightness of the subject that corresponds to various light sources stored in the secondary storage device 108. The light source determining processing may be configured to perform rule-based processing or determine an optimal light source for the color distribution of the block division data and the brightness of the subject through deep learning processing using a trained neural network.

In S1003, the CPU 103 calculates white balance correction values for the light source detected in S1002 based on the table that is stored in the secondary storage device 108 and in which white balance correction values are arranged according to the light source, using the white balance correction value calculation unit 903.

When the still image recording equivalent display mode of the display mode is selected by the user, the white balance correction value calculation unit 903 first determines whether the recording mode is set to the white priority mode or the atmosphere priority mode. Then, white balance correction values that correspond to the determined recording mode are looked up from the table that is stored in the secondary storage device 108 and in which white balance correction values are arranged according to the light source.

On the other hand, when the naked eye view equivalent display mode of the display mode is selected by the user, the white balance correction value calculation unit 903 first determines whether the brightness of the image displayed on the viewfinder is the same as that when viewed with the naked eye or the brightness of the image displayed on the viewfinder is higher than that when viewed with the naked eye. Then, white balance correction values that correspond to the result of determination are looked up from the table that is stored in the secondary storage device 108 and in which white balance correction values are arranged according to the light source.

In the second embodiment as well, the remaining amount of the light source color in each of the combinations of the white balance mode for still image recording and the white balance mode for viewfinder displaying shown in FIG. 8 is the same as that of the first embodiment. When the CPU 103 finishes the processing in S1003, the CPU 103 ends the white balance correction value calculation processing in S306, and returns to the original processing. The white balance correction value calculation processing for the still image performed in S312 is the same as that performed when the image is recorded.

As described above, in the present embodiment, white balance correction values according to various light sources are stored in the secondary storage device 108 in the form of a table, and white balance correction values that correspond to a light source determined for each block in the image are applied. In this way, as in the first embodiment, the image displayed on the EVF can be brought closer to the colors viewed with the naked eye while keeping the colors of the still image that is recorded to appropriate colors such that the color tone of the light source does not remain excessively. That is, it is possible to bring the color tone of the light source in the image that is displayed on the EVF close to the color tone of what looks like with the naked eye even when the color tone of the light source in the still image that is recorded is reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-035634, filed Mar. 5, 2021, which is hereby incorporated by reference herein in its entirety.

What is claimed is:

1. An image processing apparatus comprising:
one or more processors; and
a memory storing instructions which, when the instructions are executed by the one or more processors, cause the image processing apparatus to function as:
an obtaining unit configured to obtain an image captured by an image capturing unit;
a setting unit configured to be capable of setting a white balance recording mode that is applied to record the image as a still image and a white balance display mode that is applied to display the image before being captured as the still image on a display unit; and
a control unit configured to control white balance correction performed on the image captured by the image capturing unit,
wherein, in a case where a first display mode that is included in the display mode is set, the control unit sets an amount of a light source color that remains after the white balance correction is performed on the image before being captured as the still image in the first display mode to be larger than the amount of the light source color that remains after the white balance correction is performed on the still image in the recording mode.

2. The image processing apparatus according to claim 1, wherein the display mode further includes a second display mode, and
in a case where the second display mode of the display mode is set, the control unit sets the amount of the light source color that remains after the white balance correction is performed on the image before being captured as the still image in the second display mode to be equal to the amount of the light source color that remains after the white balance correction is performed on the still image in the recording mode.

3. The image processing apparatus according to claim 2, wherein, in the white balance correction applied when recording the still image, the recording mode includes:
a first recording mode in which the amount of the light source color in the image captured by the image capturing unit is reduced; and
a second recording mode in which the amount of the light source color that remains is set to be larger than that in the first recording mode, and
the control unit sets the amount of the light source color that remains after the white balance correction is performed on the image before being captured as the still image in a case where the second display mode and the second recording mode are set to be larger than the amount of the light source color that remains after the white balance correction is performed on the still image in a case where the second display mode and the first recording mode are set.

4. The image processing apparatus according to claim 1, wherein, in the white balance correction applied when recording the still image, the recording mode includes:
a first recording mode in which the amount of the light source color in the image captured by the image capturing unit is reduced; and
a second recording mode in which the amount of the light source color that remains is set to be larger than that in the first recording mode.

5. The image processing apparatus according to claim 1, wherein, in the white balance correction applied when recording the still image, the recording mode includes:
a first recording mode in which the amount of the light source color in the image captured by the image capturing unit is reduced; and
a second recording mode in which the amount of the light source color that remains is set to be larger than that in the first recording mode, and
the control unit sets the amount of the light source color that remains after the white balance correction is performed on the image before being captured as the still image in a case where the first display mode and the second recording mode are set to be larger than the amount of the light source color that remains after the white balance correction is performed on the still image in a case where the first display mode and the first recording mode are set.

6. The image processing apparatus according to claim 1, wherein, in a case where the first display mode is set and the image before being captured as the still image has a brightness lower than a threshold value, the control unit sets the amount of the light source color that remains after the white balance correction is performed on the image before being captured as the still image in the first display mode to be larger than the amount of the light source color that remains after the white balance correction is performed on the still image in the recording mode.

7. The image processing apparatus according to claim 1, wherein, in a case where the image before being captured as the still image has a brightness lower than a predetermined brightness threshold value in the first display mode, the control unit sets the amount of the light source color that remains after the white balance correction is performed on the image before being captured as the still image to be smaller than the amount of the light source color that remains after the white balance correction is performed on the still image in a case where the image has a brightness higher than the predetermined brightness threshold value.

8. The image processing apparatus according to claim 7, wherein the control unit determines the brightness of the image before being captured as the still image by comparing a brightness of a subject included in the image before being captured as the still image with the predetermined brightness threshold value.

9. The image processing apparatus according to claim 7, wherein the control unit changes the predetermined brightness threshold value according to settings of the display unit or the image capturing unit.

10. The image processing apparatus according to claim 9, wherein the control unit changes the predetermined brightness threshold value according to at least either one of a frame rate for displaying on the display unit and an ISO sensitivity set for the image capturing unit.

11. A control method of an image processing apparatus comprising:
obtaining an image captured by an image capturing unit;
setting a white balance recording mode that is applied to record the image as a still image and a white balance display mode that is applied to display the image before being captured as the still image on a display unit; and
controlling white balance correction performed on the image captured by the image capturing unit,
wherein, in the controlling, in a case where a first display mode that is included in the display mode is set, an amount of a light source color that remains after the white balance correction is performed on the image before being captured as the still image in the first display mode is set to be larger than the amount of the light source color that remains after the white balance correction is performed on the still image in the recording mode.

12. A non-transitory computer-readable storage medium comprising instructions for performing a control method of an image processing apparatus, the control method comprising:
obtaining an image captured by an image capturing unit;
setting a white balance recording mode that is applied to record the image as a still image and a white balance display mode that is applied to display the image before being captured as the still image on a display unit; and
controlling white balance correction performed on the image captured by the image capturing unit,
wherein, in the controlling, in a case where a first display mode that is included in the display mode is set, an amount of a light source color that remains after the white balance correction is performed on the image before being captured as the still image in the first display mode is set to be larger than the amount of the light source color that remains after the white balance correction is performed on the still image in the recording mode.

* * * * *